United States Patent
Duan et al.

(10) Patent No.: US 12,055,983 B2
(45) Date of Patent: Aug. 6, 2024

(54) LASER WELDING OF HINGE BRACKET TO AN INFORMATION HANDLING SYSTEM CASING

(71) Applicant: Dell Products L.P., Round Rock, TX (US)

(72) Inventors: Yonghong Duan, Shanghai (CN); Yaotsung Chang, Neihu District (TW)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 17/659,242

(22) Filed: Apr. 14, 2022

(65) Prior Publication Data

US 2023/0333606 A1    Oct. 19, 2023

(51) Int. Cl.
  *G06F 1/16*    (2006.01)
  *B23K 26/22*   (2006.01)
  *B23K 103/10*  (2006.01)

(52) U.S. Cl.
  CPC ............ *G06F 1/1681* (2013.01); *B23K 26/22* (2013.01); *B23K 2103/10* (2018.08)

(58) Field of Classification Search
  None
  See application file for complete search history.

(56) References Cited

U.S. PATENT DOCUMENTS

| | | | |
|---|---|---|---|
| 10,594,351 B2 * | 3/2020 | Wang | G06F 1/1658 |
| 11,656,652 B1 * | 5/2023 | Duan | G06F 1/1601 |
| | | | 361/679.21 |
| 2010/0245710 A1 * | 9/2010 | Kim | G02F 1/133308 |
| | | | 312/223.1 |

* cited by examiner

*Primary Examiner* — Anthony Q Edwards
*Assistant Examiner* — Rashen E Morrison
(74) *Attorney, Agent, or Firm* — McDermott Will & Emery LLP

(57) ABSTRACT

An information handling system chassis, including: a casing including an internal surface and an external surface, the internal surface positioned opposite to the external surface defining a first distance therebetween; and a bracket including a plurality of welding recessions, wherein the bracket is coupled to the internal surface of the casing by a plurality of welding points within the welding recessions forming radial welding patterns in each respective welding recession, wherein a second distance defined between the internal surface of the casing and a nadir surface of each of the welding recessions is approximately 50% of the first distance.

20 Claims, 7 Drawing Sheets

LASER WELDING OF HINGE BRACKET TO AN INFORMATION HANDLING SYSTEM CASING

BACKGROUND

Field of the Disclosure

The disclosure relates generally to an information handling system, and in particular, laser welding of a hinge bracket to a casing of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

There are issues of delamination of a hinge bracket from a casing of an information handling system.

SUMMARY

Innovative aspects of the subject matter described in this specification may be embodied in a casing including an internal surface and an external surface, the internal surface positioned opposite to the external surface defining a first distance therebetween; and a bracket including a plurality of welding recessions, wherein the bracket is coupled to the internal surface of the casing by a plurality of welding points within the welding recessions forming radial welding patterns in each respective welding recession, wherein a second distance defined between the internal surface of the casing and a nadir surface of each of the welding recessions is approximately 50% of the first distance.

Other embodiments of these aspects include corresponding systems, apparatus, and methods.

These and other embodiments may each optionally include one or more of the following features. For instance, the casing and the bracket are comprised of aluminum. The external surface of the casing is free of a physical impact of the welding points. The welding recessions are circular, polygonal, and/or elliptical. The first distance is less than 1.5 millimeters. The second distance is between 0.4-0.62 millimeters. The plurality of welding points include 5-9 welding points per welding recession. The plurality of welding points range in size between 0.3 mm$^2$ and 0.5 mm$^2$. The bracket is a hinge bracket.

Innovative aspects of the subject matter described in this specification may be embodied in a method of coupling a bracket to an information handling system casing, the method including forming a plurality of welding recessions in the bracket such that a second distance defined between an internal surface of the casing and a nadir surface of each of the welding recessions is approximately 50% of a first distance defined between the internal surface of the casing and an external surface of the casing, the internal surface positioned opposite to the external surface; and coupling the bracket to an internal surface of the casing, including welding the bracket to the casing at a plurality of welding points within the welding recessions forming radial welding patterns in each respective welding recession.

These and other embodiments may each optionally include one or more of the following features. For instance, the coupling the bracket to the internal surface of the casing includes maintaining a physical appearance of the external surface of the casing. Forming the plurality of the welding recessions includes forming circular, polygonal, and/or elliptical recessions. The first distance is less than 1.5 millimeters. The second distance is between 0.4-0.62 millimeters. Forming the plurality of the welding recessions includes forming 5-9 welding points per welding recession. The plurality of welding points range in size between 0.3 mm$^2$ and 0.5 mm$^2$.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
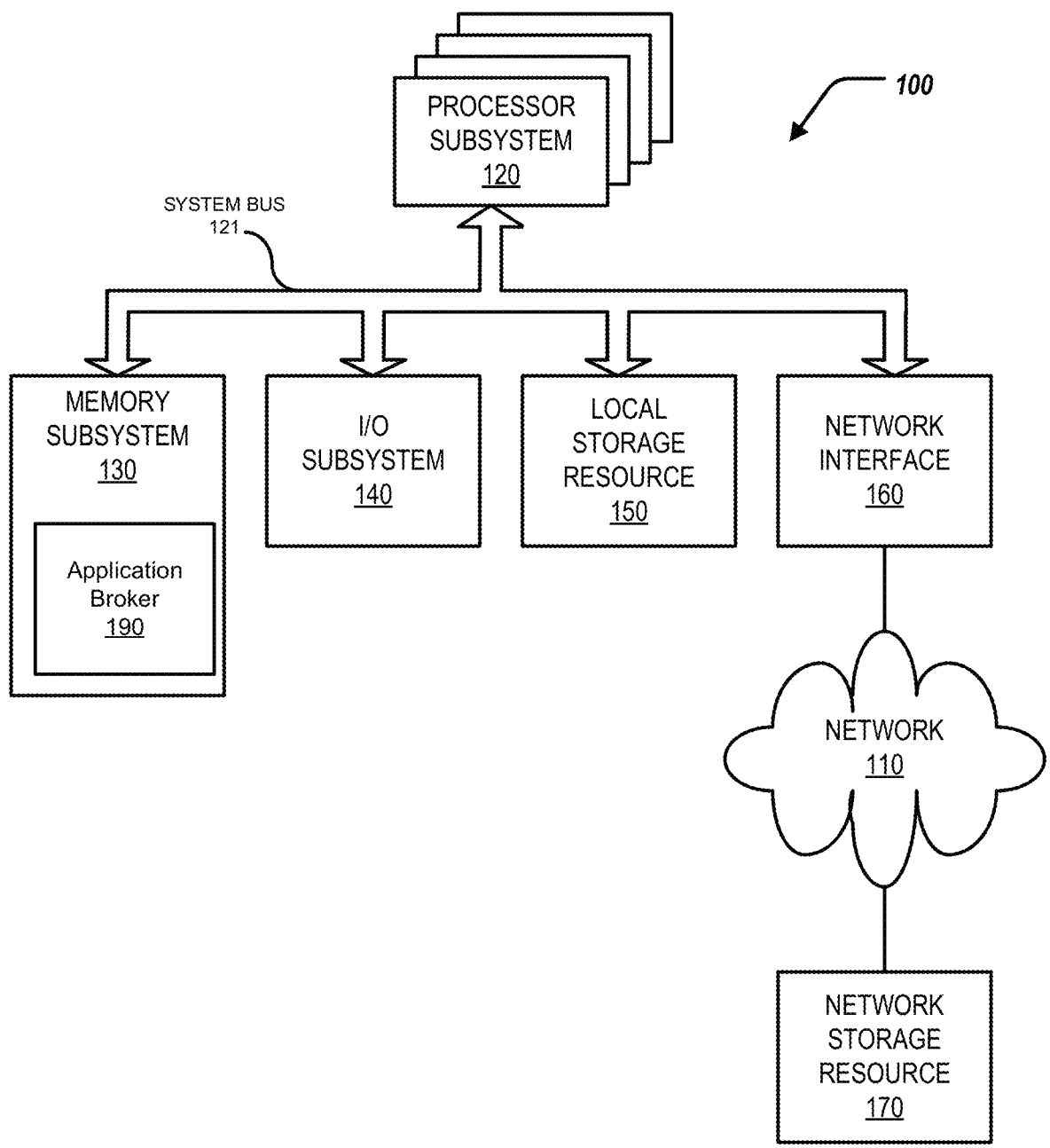
FIG. 1 is a block diagram of selected elements of an embodiment of an information handling system.

This disclosure discusses laser welding of a hinge bracket to an information handling system casing. The hinge bracket is a part of a hinge assembly, with the hinge assembly providing (or facilitating) rotation between each body of a two-body (or dual-body) information handling system. In short, a hinge bracket can be welded to a casing of the information handling system. The hinge bracket can include welding recessions that welding points are formed in to weld the hinge bracket to the casing. The welding recessions can have a thickness (between a nadir surface of the recessions and an internal surface of the casing) based on a thickness of the casing. Furthermore, the external surface of the casing, after welding the bracket to the casing, can be maintained free of physical impact of the welding points.

Specifically, this disclosure discusses an information handling system chassis, including a casing including an internal surface and an external surface, the internal surface positioned opposite to the external surface defining a first distance therebetween; and a bracket including a plurality of welding recessions, wherein the bracket is coupled to the internal surface of the casing by a plurality of welding points within the welding recessions forming radial welding patterns in each respective welding recession, wherein a second distance defined between the internal surface of the casing and a nadir surface of each of the welding recessions is approximately 50% of the first distance.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

In short, a hinge bracket can be welded to a casing of the information handling system. The hinge bracket can include welding recessions that welding points are formed in to weld the hinge bracket to the casing. The welding recessions can have a thickness (between a nadir surface of the recessions and an internal surface of the casing) based on a thickness of the casing. Furthermore, the external surface of the casing, after welding the bracket to the casing, can be maintained free of physical impact of the welding points.

Figure 2:
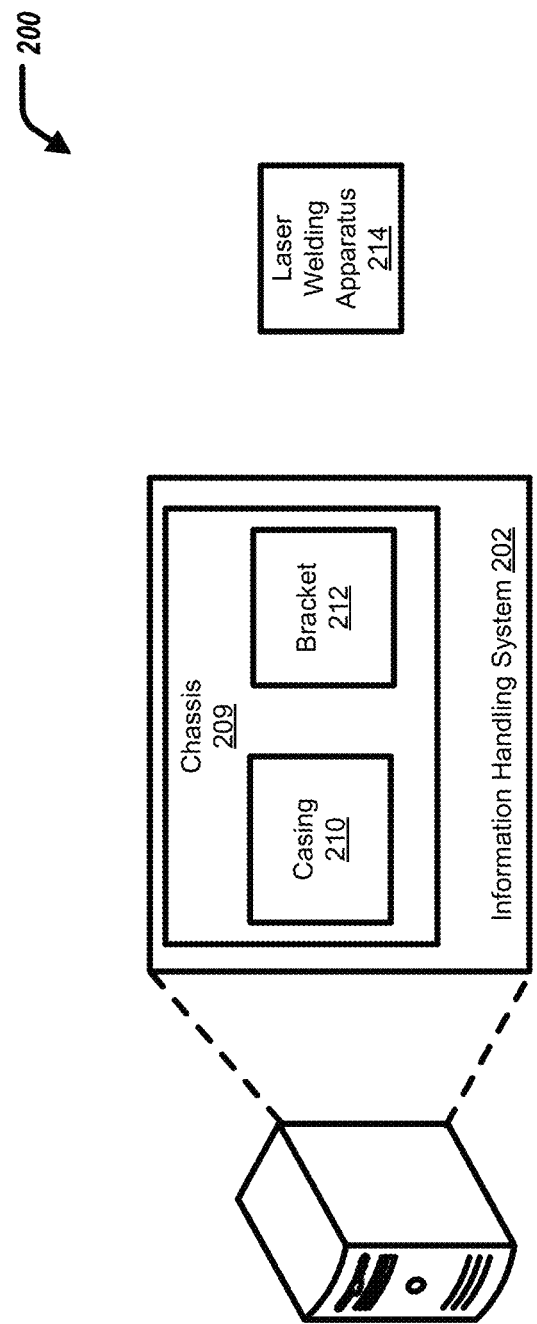
FIG. 2 illustrates a block diagram of an environment including the information handling system.

Turning to FIG. 2, FIG. 2 illustrates an environment 200 including an information handling system 202 and a laser welding apparatus 214. The information handling system 202 can include a chassis 209. The chassis 209 can include a casing 210 and a (hinge) bracket 212. The bracket 212 can be a hinge bracket that is a part of a hinge assembly, with the hinge assembly providing (or facilitating) rotation between each body of a two-body (or dual-body) information handling system (. In some examples, the information handling system 202 is similar to, or includes, the information handling system 100 of FIG. 1.

Figure 3:
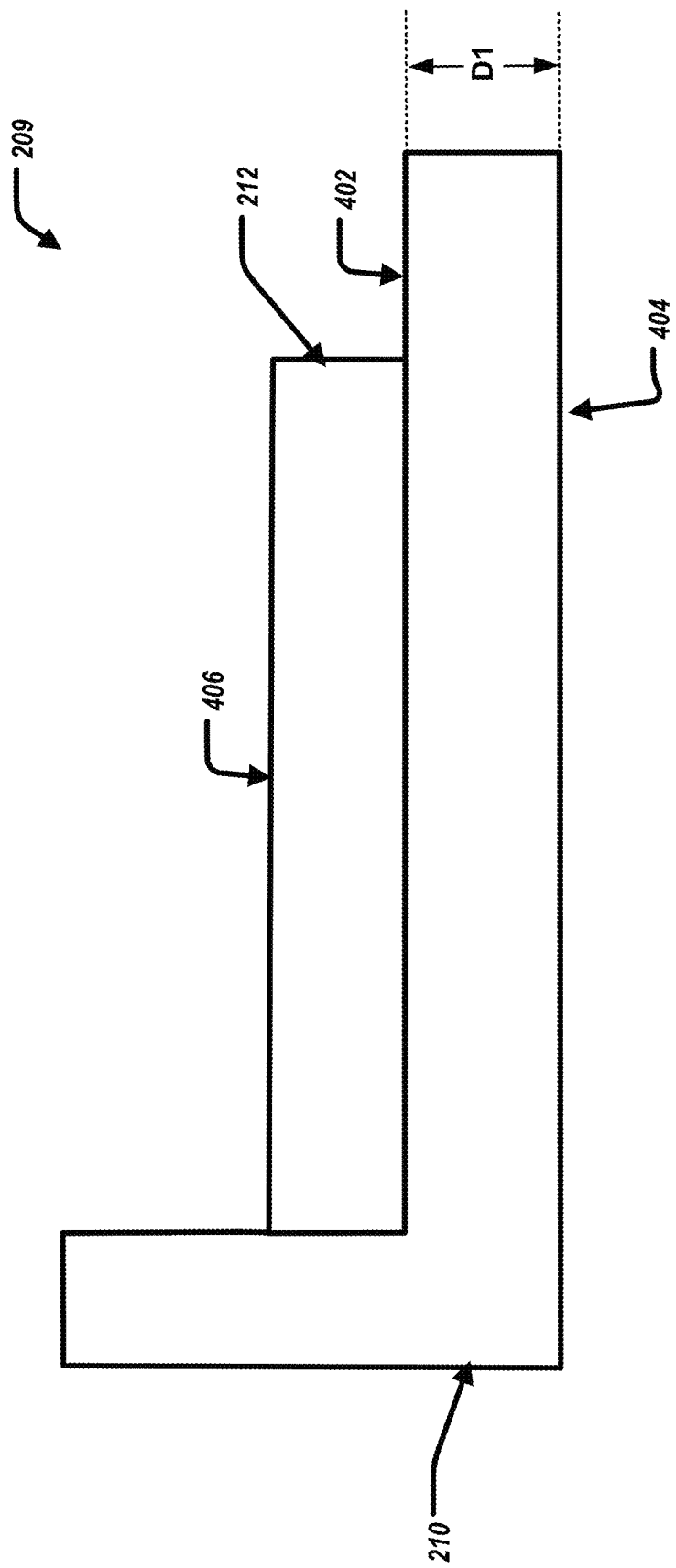
FIG. 3 illustrates a simplified cross-sectional view of a portion of the chassis prior to welding of the bracket to the casing.

Referring to FIG. 3, a simplified cross-sectional view of a portion of the chassis 209 is shown prior to welding of the bracket 212 to the casing 210. The casing 210 can include an internal surface 402 and an external surface 404. The internal surface 402 is positioned opposite to the external surface 404. The internal surface 402 is spaced-apart from the external surface 404 by a first distance D1.

In some examples, the casing 210 can be formed from aluminum.

In some examples, the first distance D1 is approximately 1.5 millimeters. In some examples, the first distance D1 is less than 1.5 millimeters. In some examples, the first distance D1 is approximately 1 millimeter.

The bracket 212 can be positioned upon the casing 210 (i.e., the internal surface 402 of the casing 210). The bracket 212 can be formed from aluminum. The bracket 212 can include a surface 406.

Figure 4:
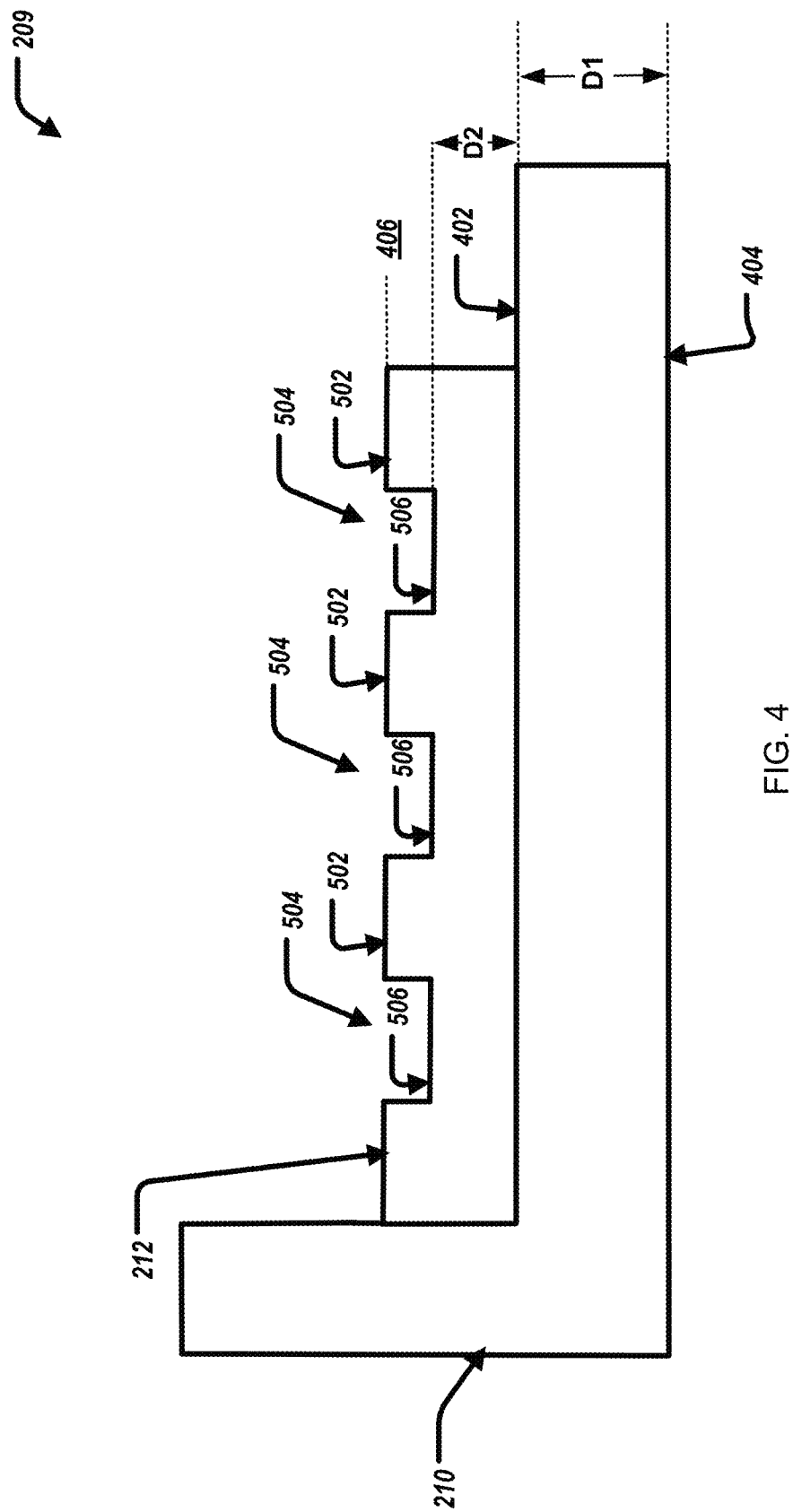
FIG. 4 illustrates a simplified cross-sectional view of the portion of the cassis after the bracket is coupled to the casing.

FIG. 4 illustrates a simplified cross-section view of the portion of the chassis 209 after welding of the bracket 212 to the casing 210. A plurality of welding recessions 504 can be formed in the surface 406 of the bracket 212. That is, the bracket 212 can be subjected to a machining processes to form the welding recessions 504 in the surface 406 of the bracket 212. In some examples, the welding recessions 504 are circular, polygonal, elliptical, or any geometric shape. Protrusions 502 can be defined between the welding recessions 504.

Each of the welding recessions 504 includes a nadir surface 506. The nadir surface 506 of each of the welding recessions 504 can be spaced-apart from the internal surface 402 of the casing 210 by a second distance D2. In some examples, the second distance D2 is approximately 50% of the first distance D1. In some examples, the second distance D2 is between 0.4 and 0.62 millimeters.

To that end, the machine process can form the welding recessions 504 in the surface 406 of the bracket 212 to have a desired shape (circular, polygonal, elliptical, or any geometric shape) and such that the second distance D2 between the nadir surface 506 of each of the welding recessions 504 and the internal surface 402 of the casing 210 is approximately 50% of the first distance D1 between the internal surface 402 and the external surface 404 of the casing 210.

After forming the welding recessions 504 in the bracket 212, the bracket 212 can be welded to the casing 210. Specifically, the laser welding apparatus 214 can be positioned adjacent to the chassis 209. The laser welding apparatus 214 can weld the bracket 212 to the casing 210. Specifically, within each of the welding recessions 504, the laser welding apparatus 214 can form a plurality of welding points within the respective welding recession 504 forming a radial welding pattern in the respective welding recessions 504. The welding points formed within each of the respective welding recessions 504 can couple the bracket 212 to the casing 210 (weld the bracket 212 to the casing 210), and in particular, couple the bracket 212 to the internal surface 402 of the casing 210.

In some examples, the laser welding apparatus 214 can form the welding points within the respective welding recession 504 based on a desired welding strength (bonding force) between the bracket 212 and the casing 210. In some examples, the welding apparatus can form the welding points within the respective welding recession 504 based on a space ("real estate") available within the welding recessions 504.

In some examples, the laser welding apparatus 214 can form 5-9 welding points within each of the respective welding recessions 504. In some examples, the laser welding apparatus 214 can form the welding points within each of the respective welding recessions 504 to range in size (area) between 0.3 mm$^2$ and 0.5 mm$^2$.

Figure 5:
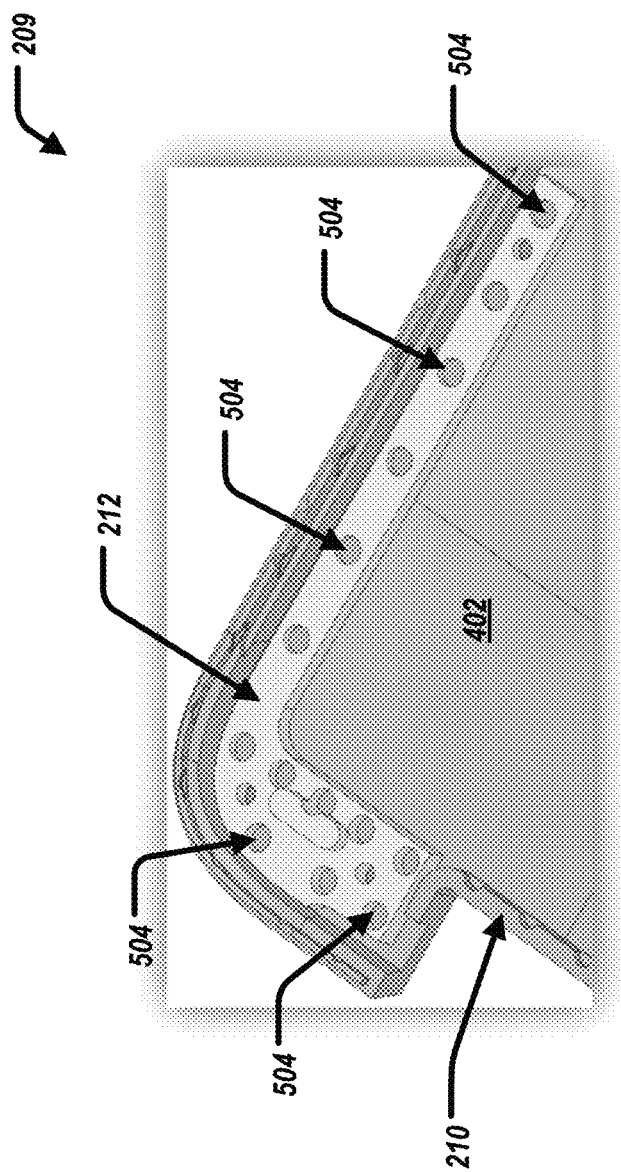
FIG. 5 illustrates a physical representation of a portion of the chassis after the bracket is coupled to the casing.

FIG. 5 illustrates a physical representation of the portion of the chassis 209, and in particular, after the bracket 212 is welded to the casing 210. The bracket 212 is shown including the welding recessions 504.

Figure 6:
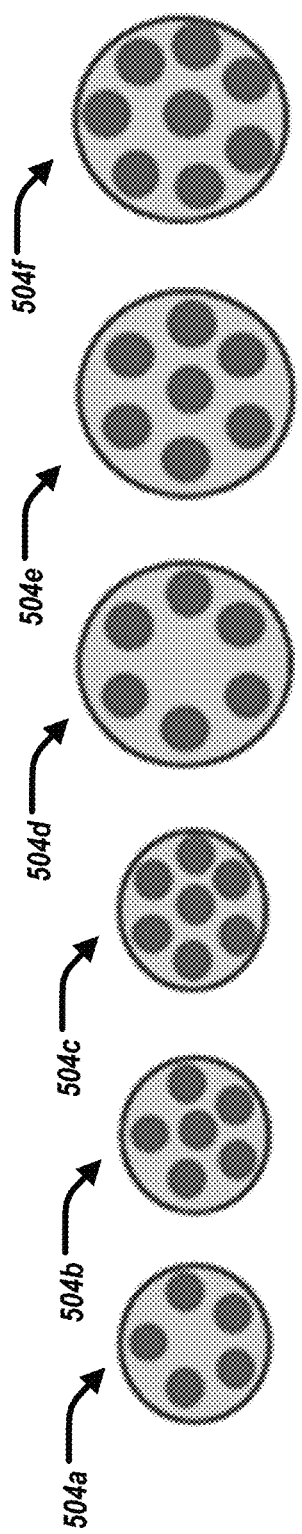
FIG. 6 illustrates a welding pattern.

FIG. 6 illustrates example differing welding patterns of the welding points that can be formed in respective welding recession 504 (shown as welding recessions 504a, 504b, 504c, 504d, 504e, 504f). For example, for a welding recession 504 of a first size (area) (shown as recessions 504a, 504b, 504c), the laser welding apparatus 214 can form a first welding pattern of 5 perimeter welding points within the recession 504a; the laser welding apparatus 214 can form a second welding pattern of 5 perimeter welding points and 1 central welding point within the recession 504b; and the laser welding apparatus 214 can form a third welding pattern of 6 perimeter welding points and 1 central welding point within the recession 504c. For example, for a welding recession 504 of a second size (area) (shown as recessions 504d, 504e, 504f) (the second size (area) larger than the first size (area)) the laser welding apparatus 214 can form a first welding pattern of 6 perimeter welding points within the recession 504d; the laser welding apparatus 214 can form a second welding pattern of 6 perimeter welding points and 1 central welding point within the recession 504e; and the laser welding apparatus 214 can form a third welding pattern of 7 perimeter welding points and 1 central welding point within the recession 504f.

In some examples, referring back to FIG. 5, when the laser welding apparatus 214 forms the welding points within the welding recessions 504, the external surface 404 of the casing 210 can be maintained free of physical impact of the welding points when formed within the welding recessions 504. That is, when the laser welding apparatus 214 forms the welding points within the welding recessions 504 to couple the bracket 212 to the casing 210, a physical appearance of the external surface 404 of the casing 210 is maintained.

After forming the welding points within the welding recessions 504, the external surface 404 of the casing 210 is anodized.

Figure 7:
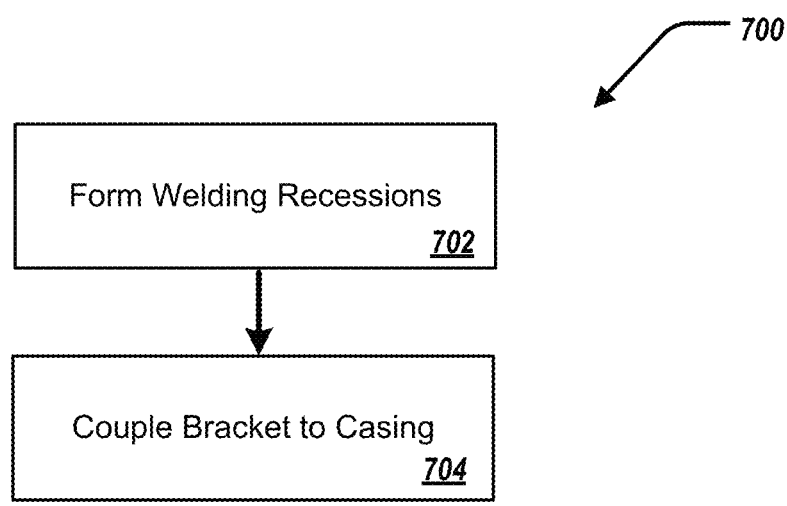
FIG. 7 illustrates a method for laser welding the bracket to the casing.

FIG. 7 illustrates a flowchart depicting selected elements of an embodiment of a method 700 for laser welding a bracket to a casing of an information handling system. The method 700 may be performed by the information handling system 100, the information handling system 202 and/or the laser welding apparatus 214, and with reference to FIGS. 1-6. It is noted that certain operations described in method 700 may be optional or may be rearranged in different embodiments.

A plurality of welding recessions 504 are formed in the bracket 212 (702). Specifically, the welding recessions 504 are formed in the bracket 212 such that the second distance D2 defined between the internal surface 402 of the casing 210 and the nadir surface 506 of each of the welding recessions 504 is approximately 50% of the first distance D1 defined between the internal surface 402 of the casing 210 and the external surface 404 of the casing 210. In some examples, the welding recessions 504 can be formed in the bracket 212 as circular, polygonal, and/or elliptical recessions.

The bracket 212 can be coupled to the internal surface 402 of the casing 210 (704). Specifically, the laser welding apparatus 214 can weld the bracket 212 to the casing 210 at a plurality of welding points within the welding recessions 504 forming a radial welding pattern in each respect welding recessions 504. In some examples, when the laser welding apparatus 214 forms the welding points within the welding recessions 504 to couple the bracket 212 to the casing 210, a physical appearance of the external surface 404 of the casing 210 is maintained. In some examples, the laser welding apparatus 214 can form 5-9 welding points per welding recession.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system chassis, including: a casing including an internal surface and an external surface, the internal surface positioned opposite to the external surface defining a first distance therebetween; and a bracket including a plurality of welding recessions, wherein the bracket is coupled to the internal surface of the casing by a plurality of welding points within the welding recessions forming a radial welding pattern in each respective welding recession, wherein a second distance defined between the internal surface of the casing and a nadir surface of each of the welding recessions is approximately 50% of the first distance; wherein the radial welding pattern includes a plurality of perimeter welding points at a perimeter of each welding recession and a central welding point at a center of each welding recession.

2. The chassis of claim 1, wherein the casing and the bracket are comprised of aluminum.

3. The chassis of claim 1, wherein the external surface of the casing is free of a physical impact of the welding points.

4. The chassis of claim 1, wherein the welding recessions are circular, polygonal, and/or elliptical.

5. The chassis of claim 1, wherein the first distance is less than 1.5 millimeters.

6. The chassis of claim 5, wherein the second distance is between 0.4-0.62 millimeters.

7. The chassis of claim 1, wherein the plurality of welding points include 5-9 welding points per welding recession.

8. The chassis of claim 7, wherein the plurality of welding points range in size between 0.3 mm$^2$ and 0.5 mm$^2$.

9. The chassis of claim 1, wherein the bracket is a hinge bracket.

10. A method of coupling a bracket to an information handling system casing, the method comprising: forming a plurality of welding recessions in the bracket such that a second distance defined between an internal surface of the casing and a nadir surface of each of the welding recessions is approximately 50% of a first distance defined between the internal surface of the casing and an external surface of the casing, the internal surface positioned opposite to the external surface; and coupling the bracket to an internal surface of the casing, including welding the bracket to the casing at a plurality of welding points within the welding recessions forming a radial welding pattern in each respective welding recession; wherein forming the radial welding pattern further includes forming the radial welding pattern to include a plurality of perimeter welding points at a perimeter of each welding recession and a central welding point at a center of each welding recession.

11. The method of claim 10, wherein coupling the bracket to the internal surface of the casing includes maintaining a physical appearance of the external surface of the casing.

12. The method of claim 10, wherein forming the plurality of the welding recessions includes forming circular, polygonal, and/or elliptical recessions.

13. The method of claim 10, wherein the first distance is less than 1.5 millimeters.

14. The method of claim 13, wherein the second distance is between 0.4-0.62 millimeters.

15. The method of claim 10, wherein forming the plurality of the welding recessions includes forming 5-9 welding points per welding recession.

16. The method of claim 15, wherein the plurality of welding points range in size between 0.3 mm$^2$ and 0.5 mm$^2$.

17. An information handling system, comprising: a processor; memory media storing instructions executable by the processor to perform operations; a chassis, including: a casing including an internal surface and an external surface, the internal surface positioned opposite to the external surface defining a first distance therebetween; and a bracket including a plurality of welding recessions, wherein the bracket is coupled to the internal surface of the casing by a plurality of welding points within the welding recessions forming a radial welding pattern patterns in each respective welding recession, wherein a second distance defined between the internal surface of the casing and a nadir surface of each of the welding recessions is approximately 50% of the first distance; wherein the radial welding pattern includes a plurality of perimeter welding points at a perimeter of each welding recession and a central welding point at a center of each welding recession.

18. The information handling system of claim 17, wherein the external surface of the casing is free of a physical impact of the welding points.

19. The information handling system of claim 17, wherein the welding recessions are circular, polygonal, and/or elliptical.

20. The information handling system of claim 17, wherein the plurality of welding points include 5-9 welding points per welding recession.

* * * * *